Patented July 2, 1929.

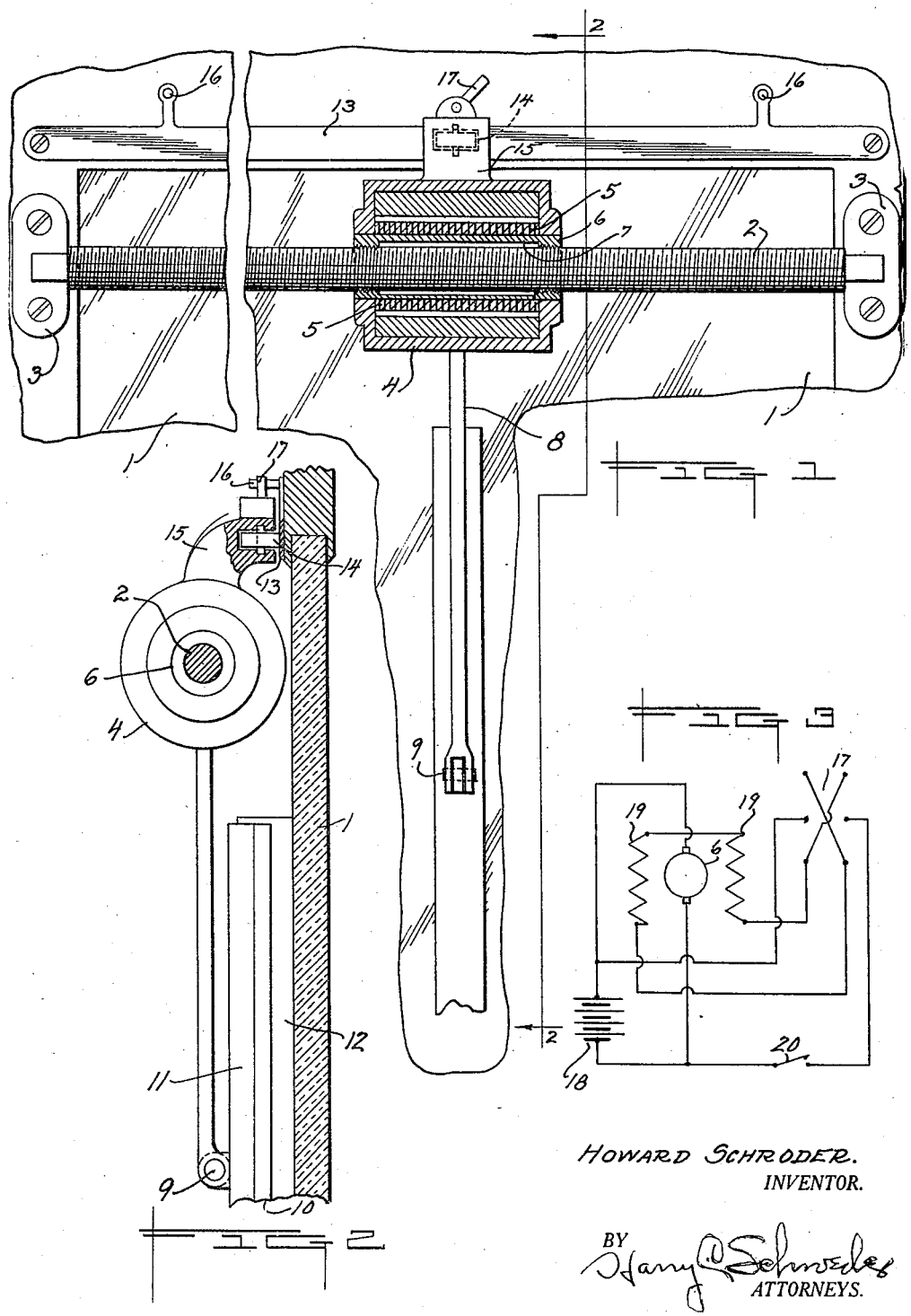

1,719,731

UNITED STATES PATENT OFFICE.

HOWARD SCHRODER, OF OAKLAND, CALIFORNIA.

WINDSHIELD WIPER.

Application filed February 28, 1927. Serial No. 171,391.

My invention relates to improvements in windshield wipers, and it consists in the combinations, constructions, and arrangements, hereinafter described and claimed.

An object of my invention is to provide a windshield wiper in which the rotor shaft is hollow and threaded for receiving a screw shaft whereby a rotation of said rotor in one direction will cause the motor to move across the front of the windshield and a reversal of the rotor's movement will reverse the direction of the motor. The motor carries a squeegee and the squeegee keeps the windshield clean by the movement of the motor to and fro.

A further object of my invention is to provide a device of the type described in which novel means is provided for applying the required amount of pressure upon the squeegee for causing it to effectually clean the glass.

Other objects and advantages will appear in the following specification, and the novel features of the invention will be particularly pointed out in the appended claims.

My invention is illustrated in the accompanying drawing, forming a part of this application, in which—

Figure 1 is a vertical section thru the device showing it operatively applied to a windshield, Figure 2 is a section along the line 2—2 of Figure 1, a portion of the motor being broken away, and Figure 3 is a wiring diagram.

In carrying out my invention, I make use of a windshield 1, to the frame of which I attach a screw shaft 2. The shaft 2 is supported by brackets 3 which prevent the shaft from rotating.

Figure 1 shows a motor 4 having a rotor 5 with a hollow, threaded shaft 6. The shaft 6 is mounted upon the screw shaft 2 and has its central portion hollowed out at 7 for reducing the friction between the two shafts. Rotation of the shaft 6 in one direction will cause the motor 4 to move across the windshield 1, while the rotation of the shaft in the opposite direction will cause the rotor to reverse its movement.

The motor 4 carries a squeegee supporting arm 8 to which a squeegee is pivotally secured at 9. The squeegee 10 consists of the usual frame 11 and rubber 12.

A rail 13 is provided at the top of the windshield for providing a track which a roller 14 bears upon. The roller is carried by a projection 15 of the motor and holds the motor in proper position for keeping the squeegee in contact with the glass. The rail 13 also carries pins 16 used for actuating a reverse switch 17.

From the foregoing description of the various parts of the device, the operation thereof may be readily understood. The speed of the motor and the number of threads on the screw shaft 2 are determined for causing the motor to make approximately 20 strokes a minute across the windshield. The source of current 18 (shown in Figure 3) may be the battery of an automobile or a separate battery. The motor 4 is of a type which will rotate in a reverse direction when the current thru the stator coil 19 is reversed. When the motor reaches its limit of travel in either direction on the shaft 2, the reverse switch lever 17 will be thrown for causing the motor to start moving in the opposite direction. This movement will continue so long as the switch 20 is closed.

I claim:

1. In a windshield cleaner, a screw shaft fixedly mounted on the windshield, an electric motor adapted to reciprocate upon the screw shaft alongside the windshield; a windshield wiper carried by said motor; and means mounted on the motor and riding upon the windshield so as to exert the required pressure upon the wiper.

2. In a windshield cleaner, a screw shaft fixedly mounted on the windshield; an electric motor adapted to reciprocate upon the screw shaft alongside the windshield, a windshield wiper carried by said motor; and a roller mounted on the motor and riding on the windshield so as to exert the required pressure upon the wiper.

3. In a windshield cleaner, a screw shaft fixedly mounted on the windshield, an electric motor adapted to reciprocate upon the screw shaft alongside the windshield, a windshield wiper carried by said motor; and a roller mounted on said motor opposite to said wiper and riding on the windshield so as to exert the required pressure upon the windshield wiper.

4. In a windshield cleaner, a screw shaft fixedly mounted on the windshield, an electric motor adapted to reciprocate upon the screw shaft alongside the windshield; a windshield wiper carried by said motor; a bracket on said motor extending oppositely to said windshield wiper; and a roller mounted on said bracket and riding upon the windshield so as to exert the required pressure on the wiper.

5. In a windshield cleaner, a screw shaft fixedly mounted on the windshield, an electric motor adapted to be moved alongside the windshield by the rotation of its armature on the screw shaft; means on the windshield for reversing the current control means of the motor at the opposite ends of its movement on the screw shaft, so as to reverse the rotation of the armature; a windshield wiper carried by said motor, said wiper being so disposed as to be in contact with the windshield; and means mounted on the motor and riding on the windshield for exerting the required pressure upon the windshield wiper.

6. In a windshield cleaner, a screw shaft fixedly mounted on the windshield, an electric motor adapted to be moved alongside the windshield by the rotation of its armature on the screw shaft; means on the windshield for reversing the current control means of the motor at the opposite ends of its movement on the screw shaft, so as to reverse the rotation of the armature; a windshield wiper carried by said motor, said wiper being so disposed as to be in contact with the windshield; and a roller mounted on the motor and riding on the windshield, said roller being so disposed as to exert the required pressure upon the windshield wiper.

7. In a windshield cleaner, a screw shaft fixedly mounted on the windshield, an electric motor adapted to be moved alongside the windshield by the rotation of its armature on the screw shaft; means on the windshield for reversing the current control means of the motor at the opposite ends of its movement on the screw shaft, so as to reverse the rotation of the armature; a windshield wiper carried by said motor, said wiper being so disposed as to be in contact with the windshield; and a bracket on said motor extending oppositely to said windshield wiper; and a roller mounted therein in coacting relation with the windshield for exerting the required pressure upon the windshield wiper.

8. In a windshield cleaner, a screw shaft fixedly mounted on the windshield, an electric motor adapted to be moved alongside the windshield by the rotation of its armature on the screw shaft; means on the windshield for reversing the current control means of the motor at the opposite ends of its movement on the screw shaft, so as to reverse the rotation of the armature; a windshield wiper carried by said motor, said wiper being so disposed as to be in contact with the windshield, a rail mounted on the windshield, and a roller mounted on the motor opposite to said windshield wiper and riding upon the rail so as to exert the required pressure on the windshield wiper.

In testimony whereof I affix my signature

HOWARD SCHRODER.